Sept. 9, 1969    C. K. N. PATEL    3,466,566

OPTICAL RESONATOR FOR LASERS

Filed Feb. 17, 1966

INVENTOR
C. K. N. PATEL
BY
Wilford L. Wiener
ATTORNEY

3,466,566
OPTICAL RESONATOR FOR LASERS
Chandra K. N. Patel, Chatham, N.J., assignor to Bell Telephone Laboratories, Incorporated, New York, N.Y., a corporation of New York
Filed Feb. 17, 1966, Ser. No. 528,197
Int. Cl. H01s 3/05, 3/22
U.S. Cl. 331—94.5                                    3 Claims

ABSTRACT OF THE DISCLOSURE

The disclosed optical resonator for gas lasers employs efficient "edge coupling" through a centrally located aperture in a reflector which has its surface oblique to the axis of the laser in the vicinity of the coupling aperture and includes an additional portion of its surface which is normal to the laser axis at a position farther from the axis than the oblique position. A technique for shaping the resultant mode to facilitate Q-switching is also disclosed.

---

This invention relates to optical resonators, such as those employed in lasers.

The term "laser" is a well-known acronym for light amplification by the stimulated emission of radiation. From the beginnings of the laser art, the optical resonator has been important to achieving laser oscillations. The optical resonator art advanced from planar reflectors to focusing reflectors of various sorts, which were formed to contain as much of the coherent light as long as possible while permitting extraneous radiations to escape more quickly. Typically, output coupling is made at one reflector in an area where the dominant resonator mode is strongest, or occurs diffusely over the entire surface of one reflector, which is made to be partially transmissive.

Recently, it has been recognized that it may often be more efficient to couple out coherent radiation near the edges of a reflector, since perturbing the oscillating mode near its null at the reflector will not impair the efficiency of oscillation as much as the more conventional methods of output coupling. Nevertheless, a serious drawback of this approach is that it yields an output beam that is annular or hollow in the center.

I have discovered that, if the oscillating mode of the resonator is essentially hollow or has a null in its center, efficient "edge coupling" can be achieved with a centrally located aperture in a reflector; and the radiation in the output beam will have a nearly normal energy distribution.

A feature of my invention is an optical resonator having at least one reflector concave-shaped to have its surface normal to the laser axis in a region spaced from the laser axis. In one specific embodiment, the reflector surface conforms to that part of a toroidal interior surface that is obtained by cutting a toroid with its revolution axis centered. That is, the reflector surface is substantially symmetrical with respect to the revolution axis of the toroid. In another specific embodiment, the reflector comprises two concave side-by-side sections of a cylinder each section being obtained by cutting the cylinder parallel to its axis.

Another more specific feature of my invention is the combination of such reflectors with a spherically curved concave reflector to form an optical resonator, the spherically curved concave reflector being adapted to shape the dominant mode to have a waist relatively near thereto, in order to facilitate Q-switching of the optical resonator.

A particular advantage of my invention resides in its suitability for gas lasers, such as the carbon dioxide laser having helium and nitrogen as auxiliary gases, that naturally tend to produce maximum gain at points off the laser axis. Such a tendency may be pronounced in cases of cooling the laser tube walls, because of a negative thermal lens effect. In still other cases, such a tendency occurs because the laser tube walls play an essential role in the pumping mechanism.

Other features and advantages of my invention will become apparent from the following detailed description and the drawing, in which.

In experiments with a high-power carbon dioxide laser of the type described in my copending application, Ser. No. 495,844, filed Oct. 14, 1965, and assigned to the assignee hereof, it was discovered that the cooling of the laser tube walls was causing the behavior of the laser to deviate substantially from the behavior expected from previous optical resonator theory. The cause of this deviation was traced to an apparent negative thermal lens effect. See my article "CW High-Power $CO_2=N_2=He$ Laser" with P. K. Tien and J. H. McFee in Applied Physics Letters, 7, 290, Dec. 1, 1965, especially footnote 7 therein.

Detailed measurements showed that maximum intensity in the laser was produced at substantial distances from both the laser axis and the tube walls. More particularly, maximum intensity was produced in a hollow cylinder-like shape about the laser axis. The shape of the mode maximum was not exactly cylindrical since it had some mid-resonator narrowing, or waist, characteristic of beams in an optical resonator. This single hollow mode oscillated in spite of the contrary influence of the concave spherically curved reflectors.

My present invention emphasizes this type of intensity variaiton by providing that the dominant resonator mode has its maximum or maxima substantially removed from the resonator axis.

Figure 1:
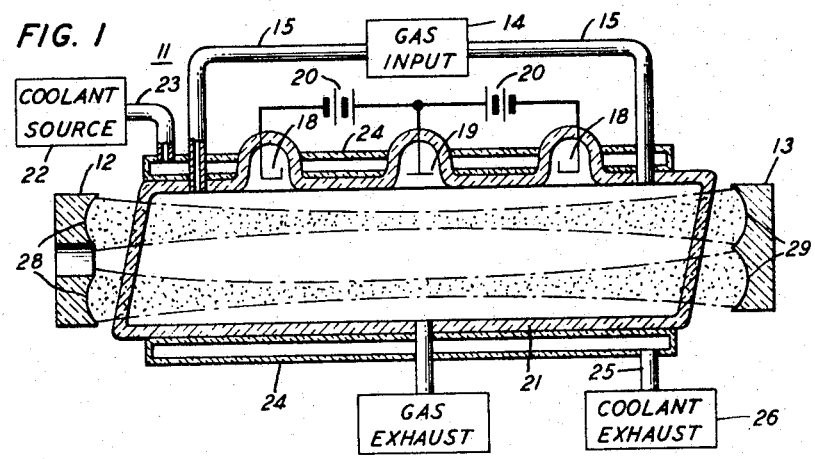
FIG. 1 is a partially pictorial and partially block diagrammatic illustration of a preferred embodiment of the invention.

More particularly, in FIG. 1, laser 11 includes an optical resonator comprising the reflectors 12 and 13. The laser also includes means 14–17 for flowing a gas mixture such as carbon dioxide, nitrogen and helium, through an interaction region within the optical resonator and within tube 21 and direct-current means 18–20 for exciting the gas mixture to populate selectively the upper laser energy level of the active component, i.e., carbon dioxide, of the mixture. The tube 21 illustratively has Brewster-angle windows of potassium chloride.

Optionally, means 22–26 for cooling the walls of the laser tube 21 may be employed, the coolant being flowed through a jacket 24 surrounding the laser tube 21.

The reflector 12 has an output coupling aperture centered on the laser axis; and each of the reflectors 12 and 13 has a reflective surface that conforms to part of the interior surface of the toroid formed by revolving a circle about an axis lying in the plane of, and passing through, the circle. In this particular case, the complete toroid would look like a doughnut swelled shut in the center. The reflecting surface of reflector 12 conforms to a portion of the interior surface of toroid that is concave and symmetrical with respect to its revolution axis, that axis being aligned with the desired laser axis. One can see, in FIG. 1, that the circular arcs shown in a cross-section of each of reflectors 13 and 12 do, or would if extended, intersect upon the laser axis.

Illustratively, each of the curved surfaces has its apparent center of curvature near the surface of the opposite mirror. Such spacing is called near-confocal for focusing reflectors. Alternatively, the curved surfaces of both reflectors may have their centers of curvature near to a common plane between them. This alternative spacing is analogous to the near concentric spacing of spherically curved reflectors, which is occasionally employed in the art.

Each reflector has an oblique portion in the vicinity of the laser axis, that is, closer to the laser axis than some portions which are normal to the laser axis. Reflector 12 is normal to the laser axis at points 28, which form a circle about the axis; and reflector 13 is normal to the laser axis at points 29, which also form a circle about the axis.

In operation, the oscillating mode conforms essentially to the dominant mode indicated, in cross-section, by the shaded area between reflectors 12 and 13 in FIG. 1. The exact shape of the oscillating mode is to some extent dependent on the temperature gradient from the laser axis to the walls of tube 21, produced by cooling the walls. The dominant mode is shaped roughly like a cylinder except that it is thinner, i.e., has a more sharply defined maximum of intensity, at a plane between reflectors 12 and 13 than at the reflectors themselves. At its inner edge, this mode just overlaps the central coupling hole in reflector 12, so that a part of the coherent radiation is extracted as an output.

Figure 3:
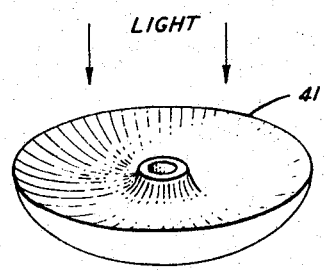

An alternative form of the reflector 12 is shown in FIG. 3 and differs in the respect that the arcs of circles appearing in a cross-section of reflecting surface 41 through the revolution axis would not intersect even if extended. In other words, the complete toroid would have a central hole as in a conventional doughnut.

Similarly, the reflector 13 of FIG. 1 may be replaced with a reflector having a surface similar to surface 41 of FIG. 3, but having a planar reflective portion in place of the central coupling aperture. Such a reflector still has an oblique portion in the vicinity of the laser axis, that is, closer to the laser axis than the normal portion that is effective in positioning the maximum intensity of the dominant mode.

Further, the central planar portion of such a reflector will not substantially affect the operation of the modified resonator. It will operate substantially as described above for the embodiment of FIG. 1, since the concave portions of the reflectors are most effective in containing and resonating the radiation.

Figure 2:
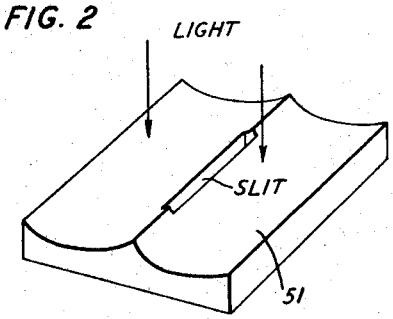
FIGS. 2 and 3 show alternative forms for reflectors employable in optical resonators according to my invention.

Another alternative form of the reflector 12 is shown in FIG. 2. In this alternative form, the reflecting surface 51 comprises two side-by-side sections of a cylinder. The reflector thus formed is substituted for reflector 12 so that the concave surfaces of the sections are presented to the interior of the resonator. The output coupling aperture is a transmissive slit-like region between the two sections. This aperture could, of course, be eliminated by extending the cylindrical surfaces to intersect if such a reflector is to be substituted for the nontransmissive reflector 13 is the optical resonator.

A further modification of the reflecting surface 51 may be made to provide that the cylindrical sections do not intersect even if extended. In that case, there may be a planar region, reflective or nonreflective between the two sections. It is still true of such a reflector that it has portions, oblique to the laser axis, that are closer to the laser axis than the portions, normal to the laser axis, that are effective to define the location of maximum intensity of the dominant mode. Thus, the output will be coupled from the laser by "edge coupling," i.e., near a null of the dominant mode, even though extracted through a central aperture.

The primary difference in the operation of reflective surfaces like surface 51 in an optical resonator, as compared to the reflective surfaces of FIGS. 1 and 3 is that the diffraction losses commonly called "walk-off" losses will be greater. These losses will result from expansion of the mode in a direction parallel to the axes of curvature of the cylindrical sections.

A still further modification of my invention involves the use of a deflector such as one of those described above in combination with a dissimilarly shaped one, for example, a spherically-curved concave reflector. In fact, at least one such combination resonator is advantageous in the respect that it facilitates Q-switching of a gas laser. An example of such an embodiment of the present invention is shown in FIG. 4.

Figure 4:
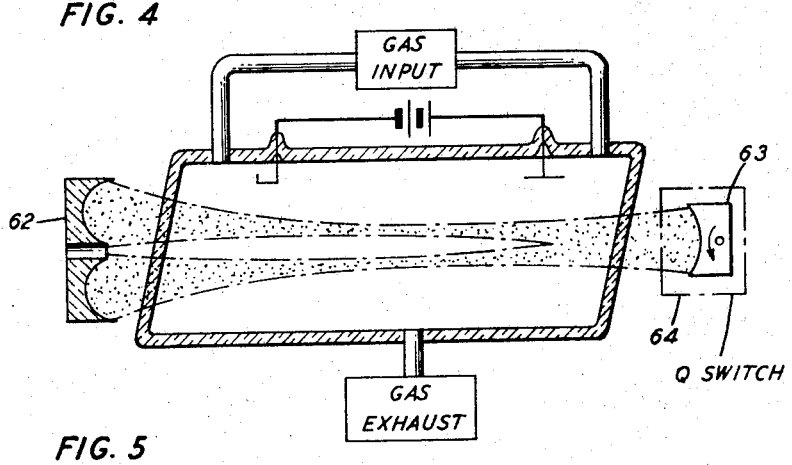
FIG. 4 is a partially pictorial and partially block diagrammatic illustration of a modified embodiment of my invention employing one spherically curved concave reflector to facilitate Q-switching of the resonator.

In FIG. 4, the laser 61 is similar to that of FIG. 1 and illustratively employs a carbon dioxide, nitrogen and helium gas mixture as taught in my above-cited copending application. The optical resonator of laser 61 includes, according to a feature of my invention, a concave reflector 62 having at least one portion normal to the laser axis at points substantially off the laser axis, a spherically-curved concave reflector 63 opposed to reflector 62 along the laser axis to form an optical resonator, and means 64 for switching the Q, or reflector efficiency, of the resonator.

The reflector 62 is illustratively like reflector 12 of FIG. 1, that is, the concave semi-toroidal form with a central coupling aperture. Alternatively, it could also have a variety of other forms, such as those of FIGS. 2 and 3, in accordance with the principles of the present invention.

Reflector 63 is an opaque, concave spherically-curved reflector of the type well-known in the laser art. Its radius of curvature is larger than the radii of curvature of the cylindrical sections of reflector 62, so that the waist of the dominant mode, as viewed externally, is formed nearer to it than to reflector 62.

The means 64 for Q-switching the resonator is illustratively means for rotating the reflector 63 about an axis orthogonal to the laser axis, but could also be an optical cell containing a saturable absorber such as kryptocyanine. In the latter case, the cell would be disposed within the resonator in the vicinity of mirror 63.

In operation, the dominant mode of the resonator of FIG. 4 will have a central null near reflector 62, but no such central null will be observable at reflector 63. In other words, the mode maximum, or maxima if considered in cross-section, will tend to coalesce on the laser axis near reflector 63.

The smaller external dimensions of the dominant mode at reflector 63 will make it easier to Q-switch the resonator in that vicinity. In the case of a rotating reflector 63, that reflector can be relatively smaller than is characteristic of the reflectors in the preceding embodiments of the invention and can therefore have a smaller moment of inertia. In the case of a saturable absorber Q-switch, the cell can have smaller lateral dimensions, enabling it to operate more efficiently and effectively. Further, the greater uniformity of radiation intensity in a cross-section of the dominant mode in this vicinity enables the saturable absorbing cell to operate more effectively.

Figure 5:
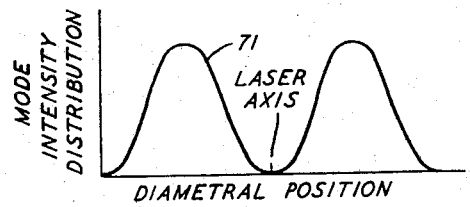
FIG. 5 shows a curve that is helpful in understanding the theory and operation of the invention.

With respect to all the preceding embodiments of the invention, it is characteristic of the operation that the dominant mode will have at least two maxima in a cross-section through the laser axis at one reflector. The intensity distribution in such a cross-section is shown in FIG. 5 as a function of diametral position at the reflector.

It may be seen that a central coupling aperture of appreciable extent will couple out coherent radiation by drawing energy from the portion of the mode represented by the tails of curve 71 in the vicinity of the laser axis. Such coupling will have little effect on the shape of the dominant mode and will not interfere with the operation of the most efficient portions of the resonator, even with output coupling that is relatively great in comparison to the degree of output coupling that is common in the art.

In all cases it is understood that the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. In a laser, an active medium for providing stimulated emission of radiation, and a resonator enclosing said active medium, said resonator comprising means for providing a dominant mode that has essentially a null at a region along the axis of said laser, said resonator being characterized in that the mode-providing means includes a pair of reflectors opposed along a common axis, at least one of said reflectors having a curved reflective surface including a portion oblique to the axis of said laser in the vicinity of said axis in the region of the null and including a portion normal to said axis at a position farther from said axis than said oblique portion, said resonator including means at the region of the null for coupling output energy from the laser.

2. In a laser, a resonator according to claim 1 in which the mode-providing means includes a reflective element conformed to a portion of an interior surface of a toroid, said portion being substantially symmetrical with respect to the revolution axis of the toroid.

3. In a laser, a resonator according to claim 1 in which the other of the opposed reflective elements is more nearly planar than the one of said reflectors in order to form the waist of the dominant mode relatively near thereto, and means in the vicinity of said other reflective element for switching the Q of said resonator.

References Cited

UNITED STATES PATENTS 3,242,439   3/1966   Rigden et al. _____ 331—94.5

RONALD L. WIBERT, Primary Examiner

V. P. McGRAW, Assistant Examiner

U.S. Cl. X.R.

350—294